US008146105B2

(12) United States Patent
Nakamura

(10) Patent No.: US 8,146,105 B2
(45) Date of Patent: Mar. 27, 2012

(54) IMAGE-FORMING DEVICE, CONTROL METHOD THEREOF, AND STORAGE MEDIUM OF STORING PROGRAM TO EXECUTE CONTROL METHOD

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1184 days.

(21) Appl. No.: 11/873,544

(22) Filed: Oct. 17, 2007

(65) Prior Publication Data
US 2008/0155563 A1 Jun. 26, 2008

(30) Foreign Application Priority Data
Dec. 21, 2006 (JP) .................. 2006-344266

(51) Int. Cl.
G06F 3/00 (2006.01)
G06F 9/44 (2006.01)
G06F 9/46 (2006.01)
G06F 13/00 (2006.01)
(52) U.S. Cl. .................. 719/318; 719/320; 719/321
(58) Field of Classification Search ............ 719/318, 719/320
See application file for complete search history.

(56) References Cited

U.S. PATENT DOCUMENTS
6,734,985 B1    5/2004  Ochiai
7,698,276 B2 *  4/2010  Seshadri et al. ............ 719/318
7,970,813 B2 *  6/2011  Lum et al. .................. 709/201
2003/0046395 A1 * 3/2003  Fleming et al. ............. 709/226

FOREIGN PATENT DOCUMENTS
JP   11-312128 A   11/1999
JP   2001-180093 A  7/2001
JP   2006-171946 A  6/2006

OTHER PUBLICATIONS

Jammes et al, Service-Oriented Device Communications Using the Devices Profile for Web Services, ACM 2005, 8 pages.*
D. Box et al., "Web Services Eventing (WS-Eventing)", Member Submission, W3C (Internet Citation), Mar. 15, 2006.
Office Action which issued on Nov. 29, 2011, in counterpart Japanese application No. 2006-344266.

* cited by examiner

Primary Examiner — Diem Cao
(74) Attorney, Agent, or Firm — Fitzpatrick, Cella, Harper & Scinto

(57) ABSTRACT

An image-forming device comprises: a notification unit to notify another device of an event generated in the image-forming device; a registration unit to register a notification destination of the notification unit; a first determination unit to determine, in a case where a request for registering a notification destination is received from a first information-processing device, validity duration of the registration based on the request; and a second determination unit to determine, in a case where a request for registering a notification destination is received from a second information-processing device, validity duration of the registration based on the request, on the basis of the validity duration determined by the first determination unit.

11 Claims, 14 Drawing Sheets

| | |
|---|---|
| NOTIFICATION LIST ID: | 1 |
| NOTIFICATION DESTINATION ADDRESS: | http://192.168.0.1/EventSink |
| NOTIFICATION CONDITION: | DeviceStateChanged |
| VALID TERM: | 12hour |

FIG. 6

```
<Envelope>
 <Body>
  <Subscribe>
   <Delivery>
    <NotifyTo>
     <Address>http://192.168.0.1/MyEventSink</Address>
     <ReferenceProperties>
      <MySubscription>2597</MySubscription>
     </ReferenceProperties>
    </NotifyTo>
   </Delivery>
   <Expires>PT10M</Expires>
   <Filter>DeviceStateChanged</Filter>
  </Subscribe>
 </Body>
</Envelope>
```

FIG. 7

```
<Envelope>
 <Body>
  <SubscribeResponse>
   <SubscriptionManager>
    <Address>http://192.168.0.100/SubscriptionManager</Address>
    <ReferenceParameters>
     <Identifier>1</Identifier>
    </ReferenceParameters>
   </SubscriptionManager>
   <Expires>PT10H</Expires>
  </SubscribeResponse>
 </Body>
</Envelope>
```

FIG. 8

```
<Envelope>
 <Header>
  <Identifier>1</Identifier>
 </Header>
 <Body>
  <Renew>
   <Expires>PT10M</Expires>
  </Renew>
 </Body>
</Envelope>
```

FIG. 9

```
<Envelope>
 <Body>
  <RenewResponse>
   <Expires>PT10M</Expires>
  </RenewResponse>
 </Body>
</Envelope>
```

FIG. 10

```
<Envelope>
 <Body>
  <Notification>
   <DeviceStateChanged>
    <State>Paper Jam</State>
   </DeviceStateChanged>
  </Notification>
 </Body>
</Envelope>
```

IMAGE-FORMING DEVICE, CONTROL METHOD THEREOF, AND STORAGE MEDIUM OF STORING PROGRAM TO EXECUTE CONTROL METHOD

BACKGROUND OF THE INVENTION

1. Field of the Invention

The present invention relates to an image-forming device which receives an event registration request from an information-processing device and executes notification in case of generating an event, and a control method which is applied to the image-forming device.

2. Description of the Related Art

Conventionally, network devices such as a printer, a multifunction device and the like which are connected to a network and thus can be operated from a computer through the network are generally used. Here, as a means for managing the network devices from the computer, a management protocol such as an SNMP (Simple Network Management Protocol) is widely used. Thus, an administrator of the network can monitor, from his/her own computer, states of these devices on the network by using the management means such as the SNMP.

Generally, systems of monitoring in real time the states of the network devices from the host computer include two kinds of systems, that is, a polling system and an event system. In the polling system, the host computer acquires the states of the devices at certain intervals. Although it is relatively easy to implement this system in the host computer and the device, the acquisition of the state is necessary even if the state of the device does not change. For this reason, in the polling system, there is a drawback that network traffics become heavy, and is a further drawback that CPU resources of the host computer and the devices are wastefully used. On the other hand, as compared with the polling system, it is relatively complicated to implement the event system in the host computer and the device. However, in the event system, since notification to the host computer is executed only when a change occurs actually in the device, there is an advantage that unnecessary traffics or the like do not occur. In any case, since the above-described SNMP is applicable to both the polling system and the event system, the administrator can appropriately use these systems according to use environments.

Further, in recent years, standardization of web service technology has advanced, and specifications for executing event transmission/reception by using web services have been formulated gradually. The relevant specifications are called "WS-Eventing (Web Services Eventing)" and are available from the Microsoft® website.

FIG. 1 illustrates a constitution which is defined by the "WS-Eventing" specifications. In FIG. 1, a subscriber 101 transmits an event registration request (REGISTER) to an event source 102. If the event registration request is received, the event source 102 generates and holds a subscription 103 which includes event transmission destination addresses, event types and the like. Further, the event source 102 responds an identifier of the subscription and its validity duration, as a response to the event registration request. After then, if an event is generated, the event source 102 transmits a notification message (NOTIFICATION) to an event sink 104. If the subscriber 101 wishes to continuously receive the notification message after the validity duration elapsed, the subscriber 101 transmits an event renew request (RENEW) to the event source 102 before the validity duration elapse. Incidentally, the subscriber 101 and the event sink 104 may be a physically identical terminal.

According to the "WS-Eventing" specifications, for example, the computer of the administrator is used as the subscriber and the event sink and the device is used as the event source, whereby the device management to which the web service technology is applied can be achieved.

Further, Japanese Patent Application Laid-Open No. H11-312128 describes a process which is to be executed when event registration is executed from a host computer.

On the other hand, with the object of the protection of environment, low power consumption is expected even in a device. For example, Japanese Patent Application Laid-Open No. 2001-180083 proposes a mechanism of aiming at power saving not only in a printer engine but also in a controller for an image process and the like. More specifically, Japanese Patent Application Laid-Open No. 2001-180083 points out as a problem that, since an externally sent communication request is conventionally monitored by a CPU constituting the controller, the power for the CPU to be used for such monitoring is wasted. For this reason, in Japanese Patent Application Laid-Open No. 2001-180083, it is monitored always, by a communication interface (communication controller) which includes an energized reception buffer, whether or not data are received from an external host computer group, thereby interrupting power-on to the controller including the CPU. Thus, it is possible to receive an external print request.

However, in case of executing such device management by the conventional event system, there is a following problem.

That is, if the device is in a power saving state, this device returns to be in a normal state every time an event registration request is received, and again enters into the power saving state after an event registration process ended. However, in a case where plural host computers execute the respective event registration processes with respect to a single device, time when each of those computers executes the event registration process is different from others. For this reason, as the number of host computers increases, the number of times that the device changes its state between the power saving state and the normal state increases, whereby the respective parts concerning such changing operations are seriously consumed. For example, if the host computers for which the validity duration of event registration elapsed request to renew event registration, those plural host computers respectively request such renewal at random. Accordingly, the device which is in the power saving state returns to be in the normal state every time those requests are received, whereby it is inefficient in power saving. On the contrary, it is conceivable to prevent, by setting no validity duration of event registration, the requests of renewal of event registration from being sent from the host computers. However, in that case, an event notification is sent even to the computer which does not expect it (for example, a host computer of which the power source is being off, a host computer which expects an event notification only during a certain period, or the like). Accordingly, to prevent such wasteful event notification, it is desirable for the device to set validity duration of event registration.

Moreover, generally, in a case where a hard disk (HDD) is used, if a power source is once turned on, power is not interrupted for a certain period of time (hereinafter, called HDD protection duration) to prevent consumption and damage of the parts in the HDD. For this reason, with respect to the device that it is necessary to turn on the power source of the HDD in the process of requesting event registration, the time during which the power source of the HDD is being on becomes longer as the number of host computers increases. As a result, an amount of power consumption increases.

SUMMARY OF THE INVENTION

The present invention aims to alleviate the above-described problems. Accordingly, the present invention firstly provides an image-forming device which can reduce, even if the number of host computers increases, the number of times of state changes between a power saving state and a normal state as compared with a conventional device. Moreover, the present invention secondly provides an image-forming device which can prolong, even if the number of host computers increases, a time during which a power source of an HDD can be interrupted, as compared with a conventional device.

To achieve such an object, a first aspect of the present invention provides an image-forming device comprising: a notification unit for notifying another device of an event generated in the image-forming device; a registration unit for registering a notification destination of the notification unit; a first determination unit for determining, in a case where a request for registering a notification destination is received from a first information-processing device, a validity duration of the registration based on the request; and a second determination unit for determining, in a case where a request for registering a notification destination is received from a second information-processing device, validity duration of the registration based on the request, on the basis of the validity duration determined by the first determination unit.

Moreover, to achieve the above object, a second aspect of the present invention provides an image-forming device comprising: a notification unit for notifying another device of an event generated in the image-forming device; a registration unit for registering a notification destination of the notification unit; a specifying unit for specifying a time when the image-forming device comes into a power saving state; and a determination unit for determining, in a case where a request for registering a notification destination is received, a validity duration of the registration based on the request, on the basis of the time specified by the specifying unit.

Other features, objects and advantages of the present invention will be apparent from the following description of exemplary embodiments when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the exemplary embodiments of the present invention and, together with the description, serve to explain the principles of the present invention.

FIG. 6 is a diagram illustrating an example of an event registration request packet.

FIG. 7 is a diagram illustrating an example of an event registration response packet.

FIG. 8 is a diagram illustrating an example of an event renewal request packet.

FIG. 9 is a diagram illustrating an example of an event renewal response packet.

FIG. 10 is a diagram illustrating an example of a notification message.

DESCRIPTION OF THE EMBODIMENTS

First Embodiment

Hereinafter, the embodiment of the present invention will be described in detail with reference to the attached drawings.

Figure 1:
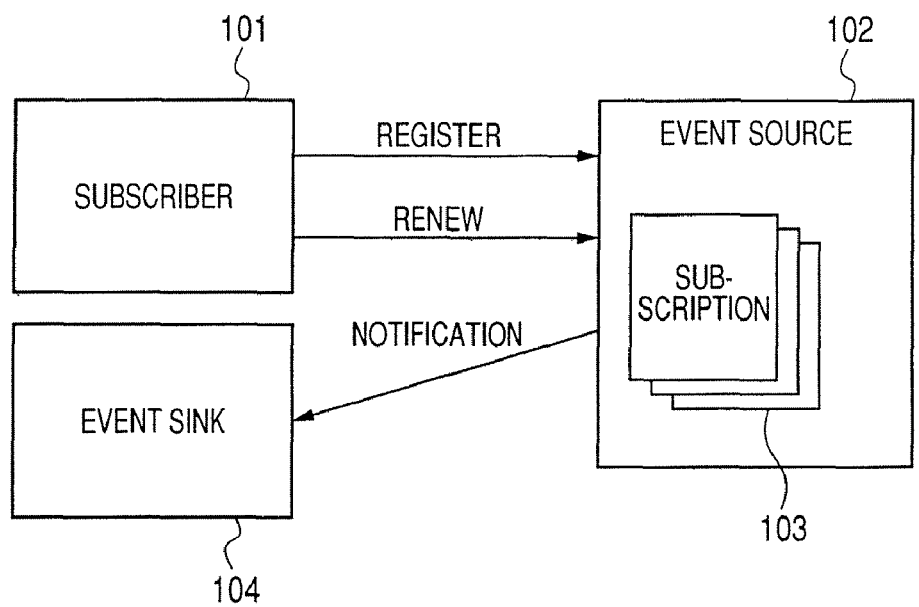
FIG. 1 is a block diagram illustrating a constitution which is defined by "WS-Eventing" specifications.
Figure 2:
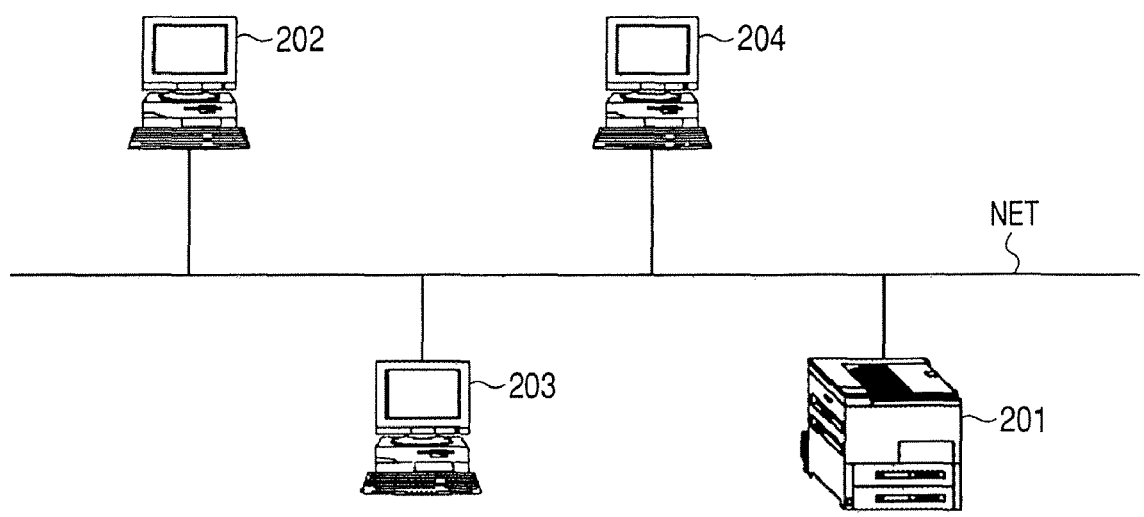
FIG. 2 is a block diagram illustrating constituents of an event registration system to which the present invention is applicable.

FIG. 2 is a block diagram illustrating constituents of an event registration system to which the present invention is applicable. FIG. 2 illustrates the constitution in which an image-forming device 201 and personal computers (PCs) 202, 203 and 204 are mutually connected through a network (NET). If it is necessary to discriminate each PC in the following description, the PC is discriminatively mentioned as the PC 202, the PC 203 or the PC 204. Incidentally, the image-forming device 201 may be a printer, a scanner, a facsimile machine, a copying machine, a multifunction machine, or the like. Further, the PC is described as an example of an information-processing device. That is, a workstation, a portable digital assistance (PDA) or the like may be used as the information-processing device.

Figure 3:
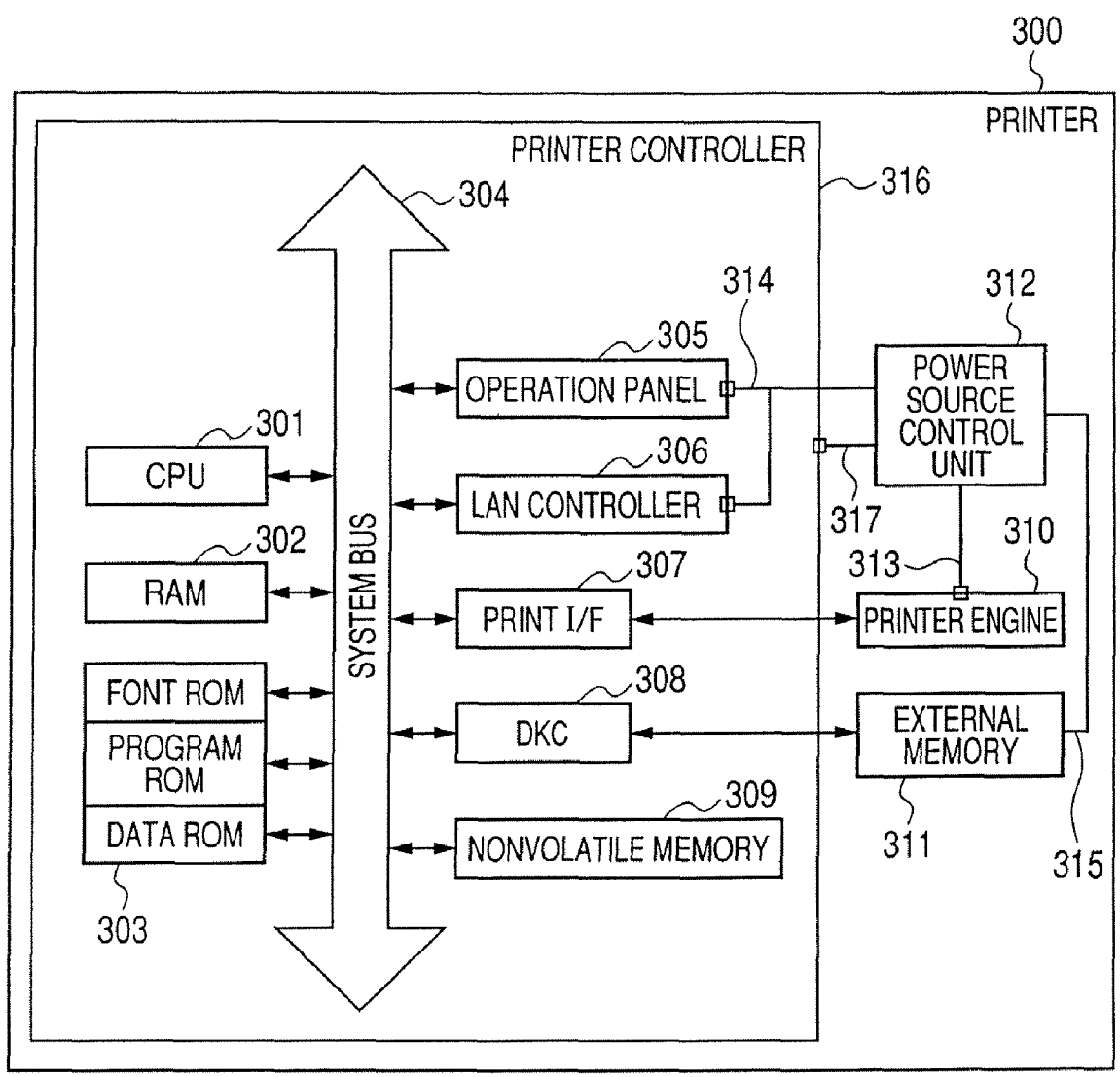
FIG. 3 is a block diagram illustrating a hardware constitution of an image-forming device.

FIG. 3 is a block diagram illustrating a hardware constitution of the image-forming device 201. In the present embodiment, for example, a case where the image-forming device 201 is a laser beam printer will be described. In a printer 300 illustrated in FIG. 3, a printer CPU (hereinafter, simply called CPU) 301 totally controls accessing operations to various devices and units connected to a system bus 304, based on a control program stored in a program ROM of a ROM 303. Further, the CPU 301 controls to output an image signal as output information to a printer engine (i.e., printer unit) 310 through a print interface (I/F) 307. Here, it should be noted that the control program and the like capable of being executed by the CPU 301 are stored in the program ROM of the ROM 303, font data (including outline font data) and the like used in case of generating the output information are stored in a font ROM of the ROM 303, and information and the like used on a host computer are stored in a data ROM of the ROM 303. Furthermore, the CPU 301 can execute a communication process to the host computer on a network through a LAN controller 306. Moreover, a RAM 302 mainly functions as a main memory, a working area and the like for the CPU 301, and the memory capacity of the RAM 302 can be expanded by using an option RAM connected to a not-illustrated expansion port. Incidentally, the RAM 302 is used as an area for extracting the output information, an area for storing environmental data, and the like. To access an external memory 311 such as a hard disk (HD), an IC card or the like is controlled by a disk controller (DKC) 308. Here, the HD is used as a job storage area on which font data, an emulation program, form data and the like are stored, and which temporarily spools a print job so that the spooled job can be controlled externally. Further, a user can input various kinds of information through software keys on an operation panel 305. Here, it should be noted that the number of external memory is not limited to "one". That is, it is possible to provide at least one or more external memories so as to store, in addition to a built-in font, an option font card, and a program for interpreting a printer control language of a different language system. Further, various setting information to be set from the operation panel 305 is stored in a nonvolatile memory 309. Although it is not illustrated, various expansion devices such as a finisher for executing a stapling function and a sorting function, a double-sided processing device for achieving a double-sided printing function, and the like can be optionally installed to the printer 300, and the operations of the various expansion devices are controlled by the CPU 301.

A power source control unit 312, which includes power supply control lines of four systems, controls power supply to the respective units of the printer 300. One of the four systems corresponds to a line 314 which is connected to the LAN controller 306 and the operation panel 305, another one of the four systems corresponds to a line 313 which is connected to the printer engine 310, another one of the four systems corresponds to a line 315 which is connected to the external memory 311, and another one of the four systems corresponds to a line 317 which is connected to the printer controller 316. Further, the printer 300 includes two power saving modes according to the portions to which the power source control unit 312 supplies power. More specifically, the power saving modes include a first power saving mode in which the power source control unit 312 supplies power only to the line 314 but does not supply power to the lines 313, 315 and 317, and a second power saving mode in which the power source control unit 312 supplies power to the lines 314 and 317 but does not supply power to the line 315. Here, in the second power saving mode, the power source control unit 312 may supply or not supply power to the line 313.

The user can register a first power saving mode transition duration to the printer 300. More specifically, if the user inputs a value such as "30 minutes" or "1 hour" through the operation panel 305, the first power saving mode transition duration is registered in the RAM 302 or the nonvolatile memory 309. If the printer 300 is in a standby state during the first power saving mode transition duration, the CPU 301 indicates the power source control unit 312 to come into the first power saving mode. Then, the power source control unit 312, which received such an indication, stops supplying power to the lines 313, 315 and 317. That is, in the first power saving mode, only the LAN controller 306, the operation panel 305 and the power source control unit 312 which are connected through the line 314 are in an operable state. Incidentally, a value determined for each device may previously be registered as the first power saving mode transition duration in the ROM or the nonvolatile memory. In this case, the user need not input the first power saving mode transition duration.

Further, a specific data pattern can be registered in the LAN controller 306. If a packet including the registered specific data pattern is received from the network, the CPU 301 indicates the power source control unit 312 to restart power supply to the line 317 so as to return the printer 300 to a normal state. Then, the CPU 301 analyzes the received packet, and thus determines whether or not a requested process is a process for which accessing to the external memory 311 is necessary. If the requested process is the process for which accessing to the external memory 311 is necessary, the CPU 301 indicates the power source control unit 312 to restart power supply to the line 315.

An HDD protection duration is registered in the ROM 303 or the nonvolatile memory 309 of the printer 300. Here, it should be noted that the HDD protection duration, such as "5 hours" or "10 hours", is upper-limit duration during which power is continuously supplied to the external memory 311. In a case where the HDD protection duration elapses from timing when a state of not supplying power to the external memory 311 previously changed to a state of supplying power to the external memory 311, the CPU 301 indicates the power source control unit 312 to come into the second power saving mode. Then, the power source control unit 312, which received such an indication, stops supplying power to the line 315. Subsequently, if a packet requesting a process for which accessing to the external memory 311 is necessary is received, the CPU 301 indicates the power source control unit 312 to restart power supply to the line 315. In that case, counting to determine whether or not the HDD protection duration elapses starts at timing when the power supply to the line 315 restarts. Incidentally, the HDD protection duration may be determined based on a value input by the user.

Figures 4, 5:
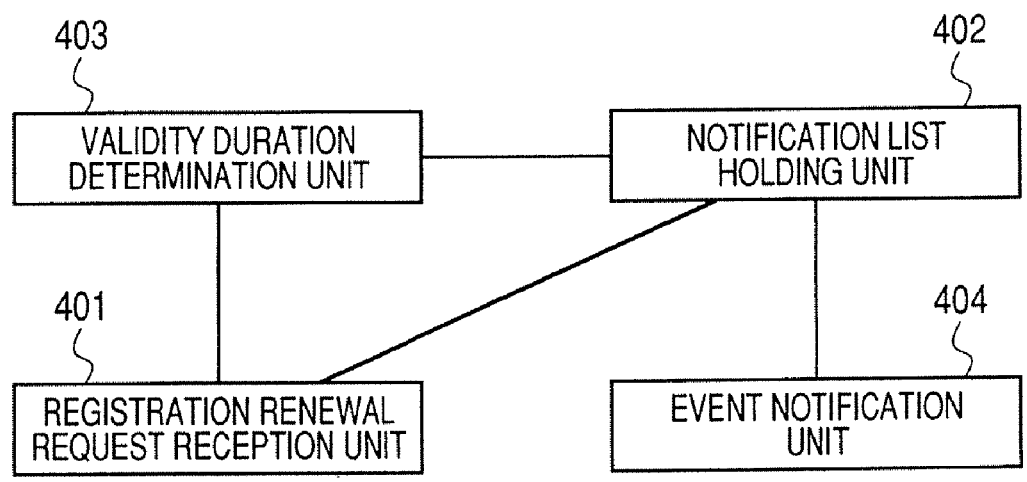
FIG. 4 is a block diagram illustrating a software configuration of the image-forming device.
FIG. 5 is a diagram illustrating an example of a notification list.

FIG. 4 is a block diagram illustrating a software configuration of the image-forming device 201. A registration renewal request reception unit 401 receives an event registration request or an event renewal request from the PC 202, creates a notification list based on the received information, and holds the created notification list in a notification list holding unit 402. For example, FIG. 5 illustrates the notification list to be held. Moreover, the registration renewal request reception unit 401 receives validity duration of registration from a validity duration determination unit 403, and transmits a response message including the validity duration to the PC 202. When an event occurs in the image-forming device, an event notification unit 404 transmits a notification message according to the information on the notification list held by the notification list holding unit 402. Here, the event includes, for example, "power OFF of image-forming device", "lack of toner", "lack of print paper", "paper jam in paper transportation", and the like. In addition, the event may include another kind of event by which the state of the image-forming device changes.

FIG. 6 is a diagram illustrating an example of an event registration request packet transmitted from the PC 202. In FIG. 6, an event notification destination is designated by a <NotifyTo> tag, a desired event registration validity duration is designated by an <Expires> tag, and a kind of event notification is designated by a <Filter> tag.

FIG. 7 is a diagram illustrating an example of an event registration response packet transmitted from the image-forming device. In FIG. 7, an ID for discriminating the created notification list is returned by an <Identifier> tag, and the event registration validity duration is returned by an <Expires> tag. Incidentally, the value of the <Expires> tag is determined by the image-forming device, as described later. That is, this value does not depend on the value designated when the event registration is requested as illustrated in FIG. 6.

FIG. 8 is a diagram illustrating an example of an event renewal request packet transmitted from the PC 202. In FIG. 8, an ID of the notification list intended to be renewed is designated by an <Identifier> tag, and a desired event registration validity duration is designated by an <Expires> tag.

FIG. 9 is a diagram illustrating an example of an event renewal response packet. In FIG. 9, the event registration validity duration is returned by an <Expires> tag. Incidentally, the value of the <Expires> tag is determined by the image-forming device, as described later. That is, this value does not depend on the value designated when the event renewal is requested as illustrated in FIG. 8.

FIG. 10 is a diagram illustrating an example of a notification message packet to be transmitted from the image-forming device to the PC 202 when an event occurs in the image-forming device. The example of FIG. 10 indicates that a paper jam occurs in the image-forming device.

Figure 11:
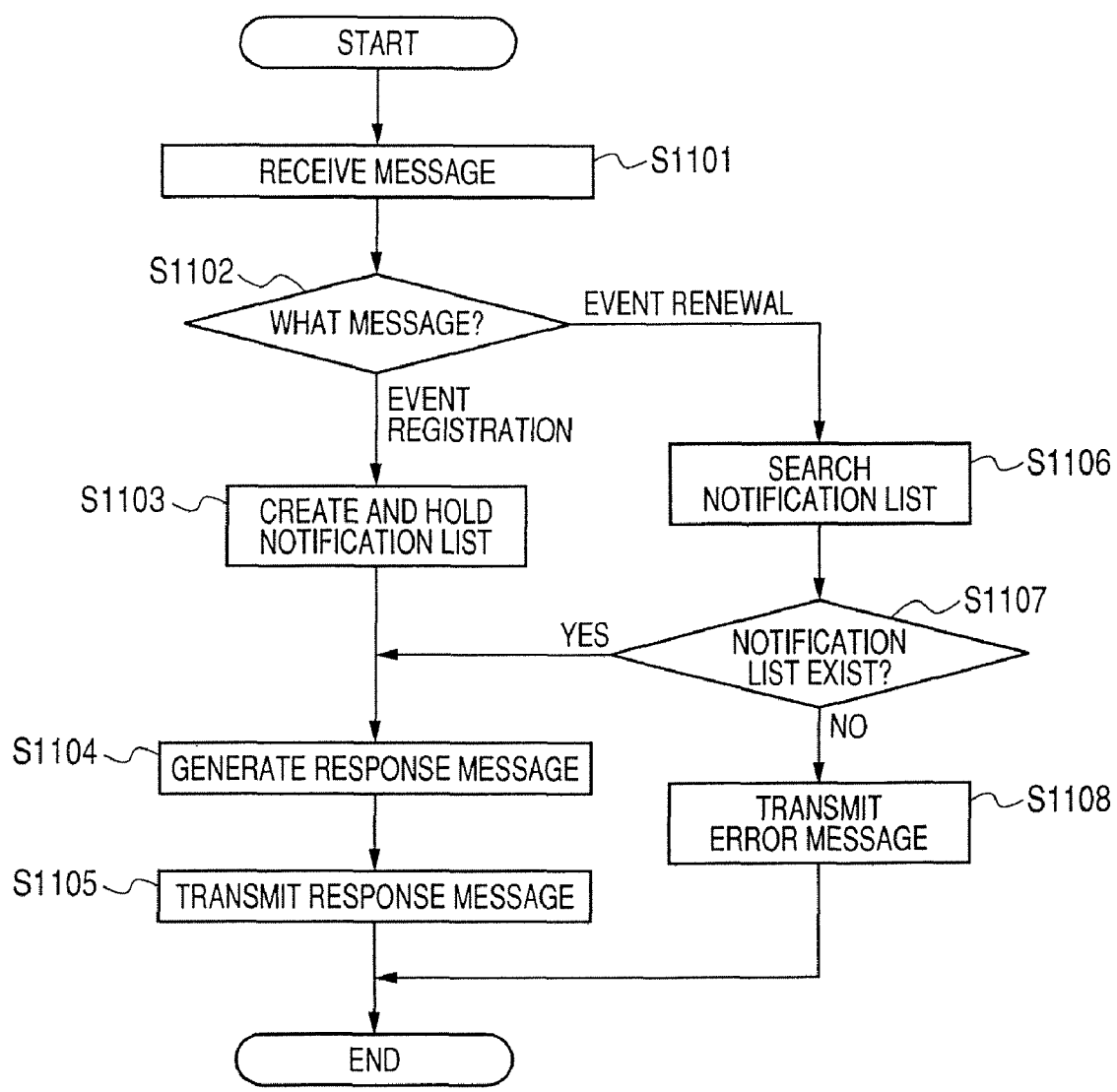
FIG. 11 is a flow chart illustrating a process of a registration renewal request reception unit.

FIG. 11 is a flow chart illustrating a process to be executed by the registration renewal request reception unit 401 in the image-forming device according to the present embodiment. Initially, if a message is received from the PC 202 in a step S1101, a kind thereof is determined in a step S1102. More specifically, if it is determined that the received message is an event registration request, the flow advances to a step S1103 to newly create and hold a notification list in the notification list holding unit 402. Next, a response message is generated by using the validity duration determined by the validity duration determination unit 403 in a step S1104, and the generated response message is transmitted to the PC 202 in a step S1105. On the other hand, if it is determined that the message received in the step S1101 is an event renewal request, the flow advances to a step S1106 to search for, in the notification list holding unit 402, the notification list corresponding to a designated identifier. Next, it is determined in a step S1107 whether or not the notification list actually exists in the notification list holding unit 402. If it is determined that the notification list exists, the flow advances to the step S1104 to generate the response message by using the validity duration determined by the validity duration determination unit 403, and the flow further advances to the step S1105 to transmit the generated response message to the PC 202. On the other hand, if it is determined in the step S1107 that the notification list does not exist in the notification list holding unit 402, the flow advances to a step S1108 to transmit an error message to the PC 202.

Figure 12:
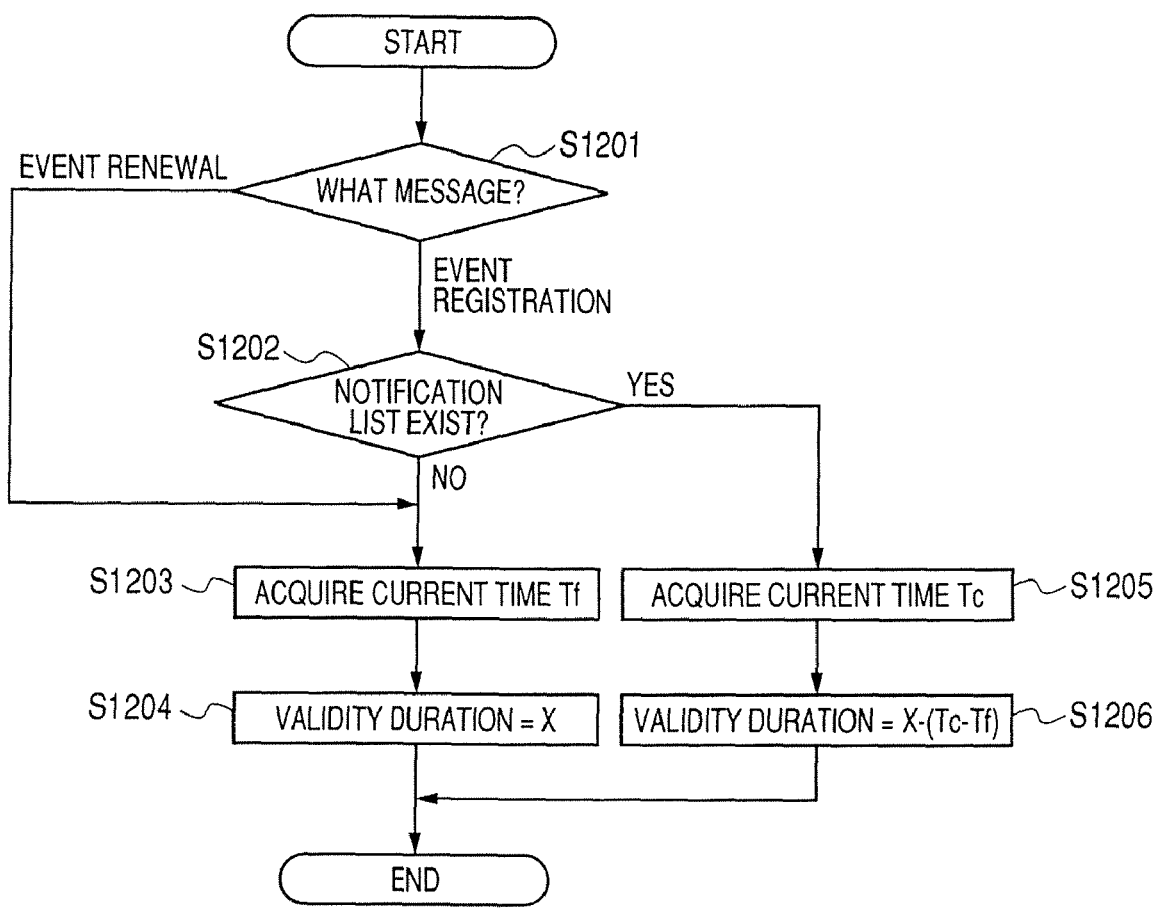
FIG. 12 is a flow chart illustrating a process of a validity duration determination unit according to the first embodiment.

FIG. 12 is a flow chart illustrating a process of the validity duration determination unit 403.

Initially, in a step S1201, a kind of message received is determined. That is, if it is determined that the received message is an event registration request, the flow advances to a step S1202 to further determine whether or not the notification list already exists. If it is determined that the notification list does not exist yet, the flow advances to a step S1203 to acquire and hold a current time Tf, and the flow further advances to a step S1204 to determine the validity duration as a prescribed value X. Here, the prescribed value X is stored in the ROM 303 or the nonvolatile memory 309 of the image-forming device. Incidentally, the prescribed value X may be a value which is determined by a user or value which is determined for each device and cannot be changed by the user. On the other hand, if it is determined in the step S1202 that the notification list already exists, the flow advances to a step S1205 to acquire a current time Tc, and the flow further advances to a step S1206 to determine the validity duration according to an expression "validity duration=X−(Tc−Tf)", where Tf is the current time related to the notification list.

More specifically, first, a difference between the current time and the time when the event registration request that started the notification list was received before is acquired. For example, if it is assumed that the current time when the event registration request is received is "7:00" and the time when the event registration request was received before to create the notification list is "6:00", the different "1 hour" is acquired because "Tc=7:00" and "Tf=6:00". Next, a difference between the prescribed value of the validity duration of event registration and the value acquired by "Tc−Tf" is acquired. For example, if it is assumed that the prescribed value is "5 hours", the difference "4 hours" is acquired because "X=5 hours" and "Tc−Tf=1 hour", whereby the validity duration of event registration is determined as "4 hours".

Incidentally, as apparent from the above, it only has to know the difference between the times when the notification list is created. For this reason, in a case where the image-forming device does not have any timer, the information acquired in each of the steps S1203 and S1205 may be "duration from a startup of the image-forming device" instead of "time".

On the other hand, if it is determined in the step S1201 that the received message is an event renewal request, the flow advances to the step S1203 to acquire a current time to renew the value of Tf and hold the renewed current time Tf, and the flow further advances to the step S1204 to determine the validity duration as the prescribed value X.

Figure 13:
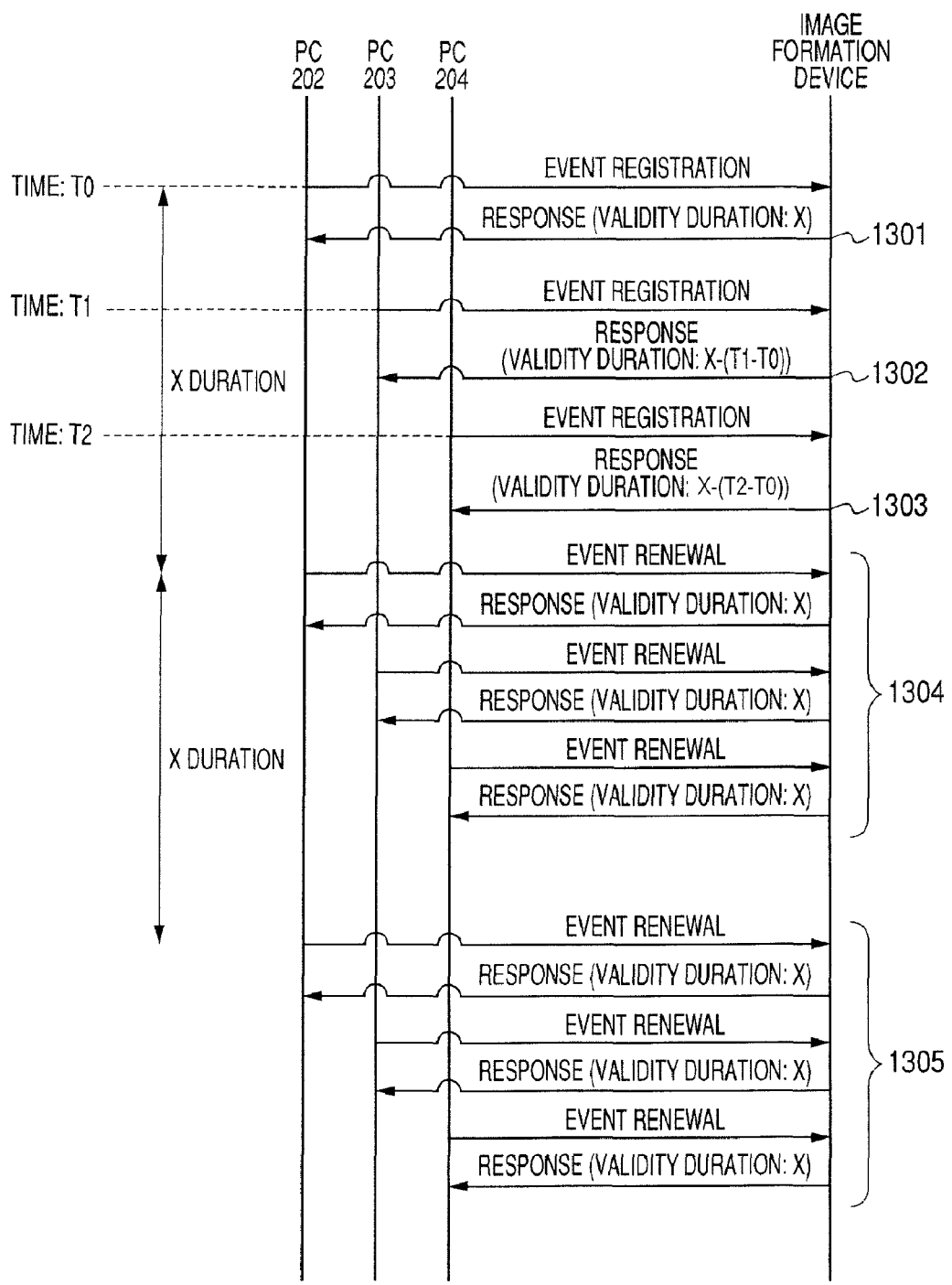
FIG. 13 is a diagram illustrating event registration/renewal states according to the first embodiment.

FIG. 13 is a diagram illustrating event registration/renewal states in a case where the PCs 202, 203 and 204 exist, according to the present embodiment.

At a time T0, the PC 202 executes the event registration request to the image-forming device. Then, the PC 203 executes the event registration request at a time T1, and the PC 204 executes the event registration request at a time T2. In such an illustrated example, the current time Tf that started the notification list corresponds to the time T0, and the current time Tc corresponds to the time T1 or T2. In a process 1301, the image-forming device sends the validity duration X to the PC 202 according to the flow chart illustrated in FIG. 12. In a process 1302, the image-forming device responds the validity duration "X−(T1−T0)" to the PC 203. Further, in a process 1303, the image-forming device responds the validity duration "X−(T2−T0)" to the PC 204. For this reason, as in a process 1304, the event renewal requests are executed from all the PCs at a time "T0+X". In that case, since the image-forming device responds the validity duration "X" to all the PCs, all the PCs thereafter execute the event renewal requests every "X" hours as in a process 1305.

Subsequently, the example illustrated in FIG. 13 will further be described concretely by using actual durations and times. First, the PC 202 transmits the event registration request to the image-forming device at "6:00". Since any notification list does not exist yet in the image-forming device at this moment, the image-forming device notifies the PC 202 of the prescribed value "5 hours" as the validity duration of event registration.

Next, the PC 203 transmits the event registration request to the image-forming device at "7:00". At this moment, the notification list exists in the image-forming device. Thus, the image-forming device calculates the validity duration of event registration from the PC 203, based on "1 hour" being the difference between "7:00" and "6:00" and the prescribed value "5 hours". As a result, the image-forming device calculates that the validity duration of event registration from the PC 203 is "4 hours", and thus notifies the PC 203 of the calculated result.

Next, the PC 204 transmits the event registration request to the image-forming device at "8:00". At this moment, the notification list exists in the image-forming device. Thus, the image-forming device calculates the validity duration of event registration from the PC 204, based on "2 hours" being the difference between "8:00" and "6:00" and the prescribed value "5 hours". As a result, the image-forming device calculates that the validity duration of event registration from the PC 204 is "3 hours", and thus notifies the PC 204 of the calculated result.

As a result, with respect to all the three PCs 202, 203 and 204, the validity duration of event registration expires at same "11:00". Accordingly, the times when these three PCs respectively transmit the event renewal requests to the image-forming device conform to others. Moreover, with respect to these event renewal requests, the image-forming device responds the prescribed value "5 hours" as the validity duration, whereby the times when these three PCs respectively transmit the event renewal requests to the image-forming device always conform to others after that.

Figure 14:
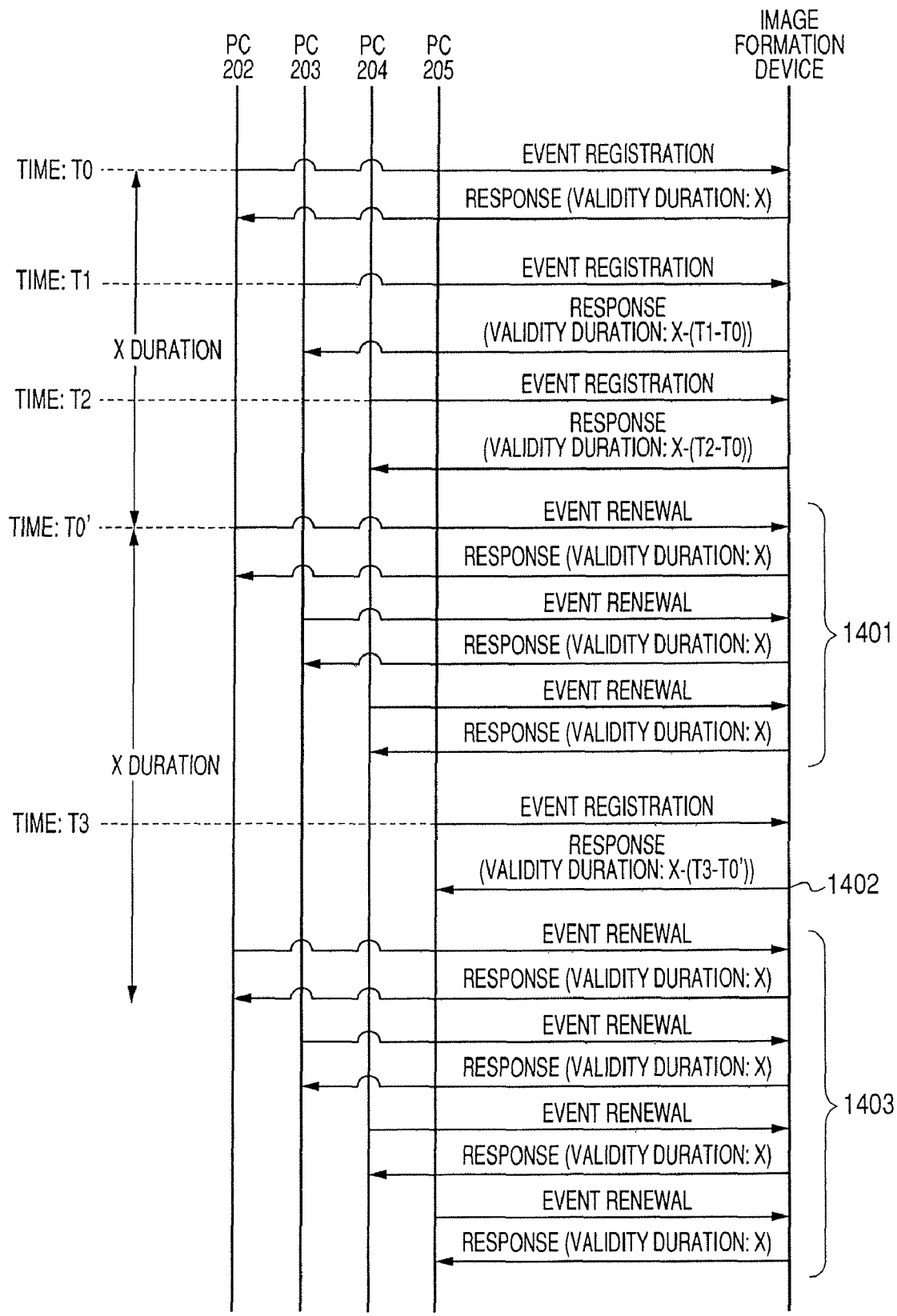
FIG. 14 is a diagram illustrating event registration/renewal states according to the first embodiment.

FIG. 14 is a diagram illustrating a state that, in addition to the PCs 202, 203 and 204 exemplarily illustrated in FIG. 13, a fourth PC 205 further executes an event registration request.

The PC 205 executes the event registration request at a time T3. According to the event renewal processes from the PCs 202, 203 and 204 in a process 1401, the value of the current time Tf is renewed as T0'="T0+X". Then, in a process 1402, the image-forming device responds "X−(T3−T0')" as the validity duration to the PC 205. For this reason, as in a process 1403, all the PCs execute the event renewal requests at a time "T0'+X".

Subsequently, the example illustrated in FIG. 14 will further be described concretely by using actual durations and times. As exemplarily illustrated in FIG. 13, the three PCs 202, 203 and 204 respectively transmit the event renewal requests to the image-forming device at "11:00" (process 1401). With respect to the event registration requests, the image-forming device renews the current time Tf as "11:00", and then responds "5 hours" being the prescribed value "5 hours" as the validity duration of event registration.

After then, the PC 205 transmits the event registration request to the image-forming device at the time "14:00". At this moment, the notification list exists in the image-forming device. Thus, the image-forming device calculates the validity duration of event registration for the PC 205, based on "3 hours" being the difference between "14:00" and "11:00" and the prescribed value "5 hours". As a result, the image-forming device calculates that the validity duration of event registration for the PC 205 is "2 hours", and thus notifies the PC 205 of the calculated result.

As a result, with respect to the four PCs 202, 203, 204 and 205, the validity duration of event registration expires at same "16:00". Accordingly, the times when these four PCs respectively transmit the event renewal requests to the image-forming device conform to others. Moreover, with respect to these event renewal requests, the image-forming device responds the prescribed value "5 hours" as the validity duration, whereby the times when these three PCs respectively transmit the event renewal requests to the image-forming device always conform to others after that.

As just described, according to the present embodiment, it is possible to conform the times when the event renewal requests are sent from the plural PCs to others, and it is moreover possible to conform the validity duration of event registration from the plural PCs to others. Consequently, it is possible to prevent that the event renewal requests are sent from the plural PCs respectively at different times.

Second Embodiment

Subsequently, the second embodiment of the present invention will be described. In the present embodiment, since hardware and software constitutions of the image-forming device are the same as those in the first embodiment, only a validity duration determination process which is different from that in the first embodiment will be described.

In the present embodiment, in case of executing the event registration and renewal process, it is necessary that the power source of the external memory 311 has been turned on. That is, each of the event registration request and the event renewal request in the present embodiment is a packet which requires a process in which it is necessary to access the external memory 311. Here, as an example of the process in which it is necessary to access the external memory 311, a case where the notification list holding unit 402 exists in the external memory 311 is conceivable, because the CPU 301 has to access the external memory 311 to register or renew the notification list based on the event registration request or the event renewal request. Accordingly, in the present embodiment, in a case where the image-forming device is in the first power saving mode or the second power saving mode, if the event registration request or the event renewal request is received, the image-forming device supplies power to the line 315 to return its state from the first or second power saving mode.

Figure 15:
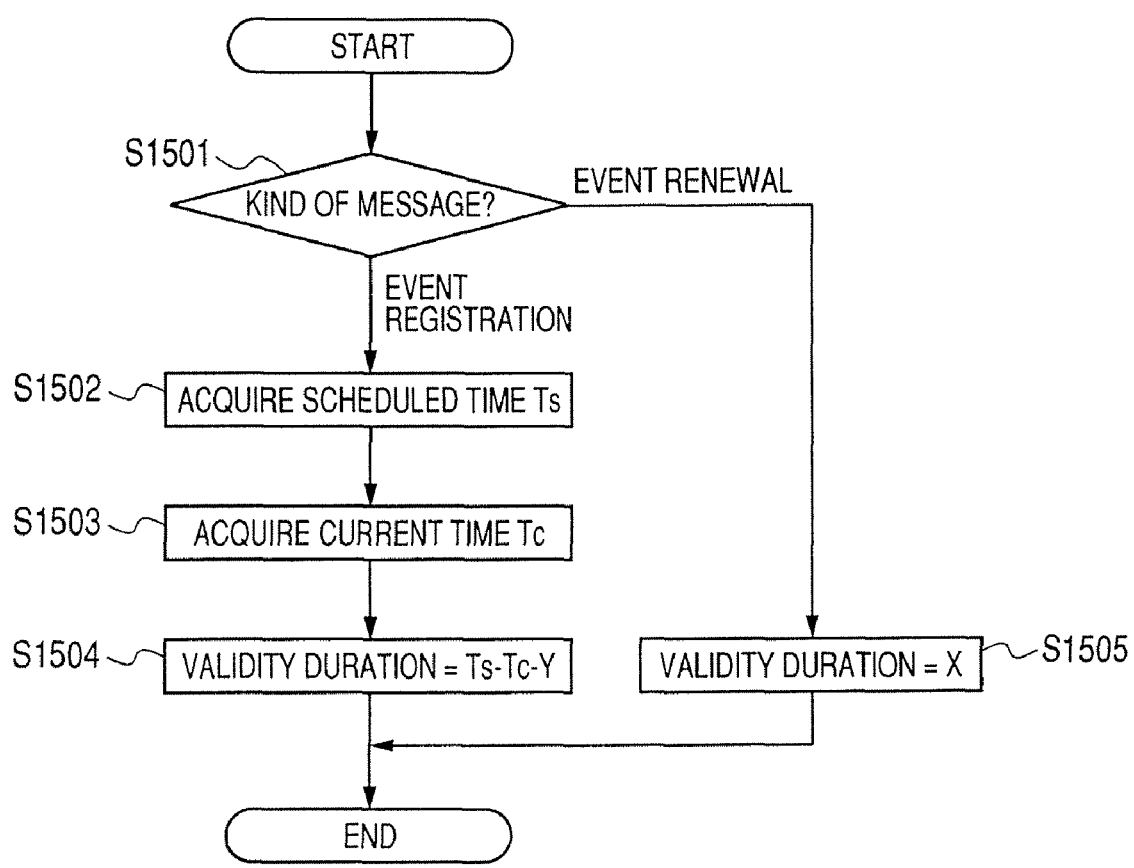
FIG. 15 is a flow chart illustrating a process of the validity duration determination unit according to the second embodiment.

FIG. 15 is a flow chart illustrating a process to be executed by the validity duration determination unit 403.

In FIG. 15, a kind of message received is determined in a step S1501. More specifically, if it is determined that the received message is the event registration request, the flow advances to a step S1502 to acquire a scheduled time Ts. Here, it should be noted that the scheduled time is a time when the image-forming device is scheduled to come into the second power saving mode (also called a sleep mode).

As described above, the image-forming device comes into the second power saving mode if the HDD protection duration elapses from timing when the state of not supplying power to the external memory 311 previously changed to the state of supplying power to the external memory 311. Accordingly, the scheduled time Ts is calculated from the time that power began to be supplied to the external memory 311 previously and the HDD protection duration. For example, if the power began to be supplied to the external memory at "5:00" and the HDD protection duration is "10 hours", the scheduled time is calculated as "15:00".

Next, the current time Tc is acquired in a step S1503. Subsequently, in a step S1504, a difference between the schedule time Ts and the current time Tc is calculated to determine the validity duration of event registration. Here, it should be noted that the validity duration of event registration is not determined as the value "Ts−Tc" but is determined as a value acquired by further subtracting a predetermined value "Y" from the value "Ts−Tc". In any case, the predetermined value "Y" may be a value which has been previously registered by a user or a value which is determined for each device. For example, it is preferable that the predetermined value "Y" is a comparatively small value such as "10 minutes". In the step S1504, if the validity duration of event registration is simply determined as "Ts−Tc", the time when the validity duration of event registration expires and the scheduled time when the image-forming device comes into the second power saving mode just coincide with each other. For this reason, it is conceivable that the event renewal request is sent immediately after the image-forming device came into the second power saving mode, and the image-forming device thus returns to a normal mode. This is ineffective from the viewpoint of power saving. Accordingly, it only has to receive the event renewal request slightly before the image-forming device comes into the second power saving mode, that is, slightly before the scheduled time Ts. In other words, it only has to determine the validity duration of event registration so that the validity duration of event registration expires slightly before the scheduled time Ts. Here, it should be noted that the time indicating "slightly before" is equivalent to the predetermined value "Y". In any case, such a time "Y" is called a margin time.

On the other hand, if it is determined in the step S1501 that the received message is the event renewal request, the flow advances to the step S1505 to determine the validity duration as the prescribed value X.

Figure 16:
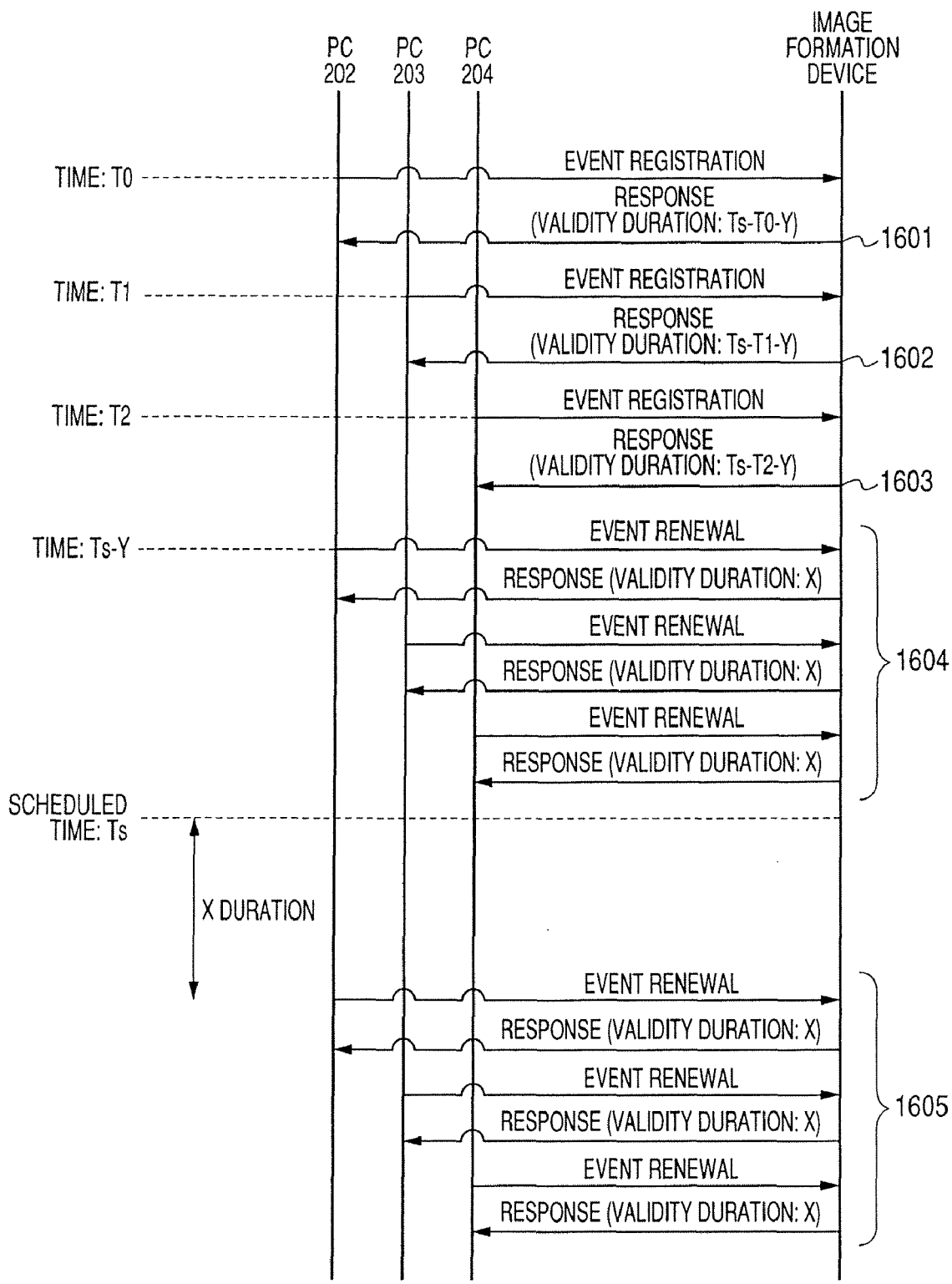
FIG. 16 is a diagram illustrating event registration/renewal states according to the second embodiment.

FIG. 16 is a diagram illustrating event registration/renewal states in a case where the PCs 202, 203 and 204 exist, according to the present embodiment. In FIG. 16, it is assumed that the power source of the external memory 311 has been turned on according to the operation state before the event registration is executed, and it is further assumed that the scheduled time when the HDD protection duration expires and the image-forming device comes into the second power saving mode is "Ts".

The PC 202 first executes the event registration request at the time T0, the PC 203 first executes the event registration request at the time T1, and the PC 204 first executes the event registration request at the time T2. Then, the image-forming device, which received these event registration requests, responds the validity duration "Ts−T0−Y" to the PC 202 (1601), the validity duration "Ts−T1−Y" to the PC 203 (1602), and the validity duration "Ts−T2−Y" to the PC 204 (1603). As a result, the event renewal requests from the PCs 202, 203 and 204 are all executed at a time "Y" hours before the scheduled time Ts (1604). In that case, since the image-forming device responds the validity duration "X" to all the PCs, all the PCs thereafter execute the event renewal requests every "X" hours as in a process 1605.

Subsequently, the example illustrated in FIG. 16 will further be described concretely by using actual durations and times. Here, it is assumed that the scheduled time Ts is "15:00" and the margin time Y is "10 minutes". First, the PC 202 transmits the event registration request to the image-forming device at "6:00". That is, the time Tc in FIG. 15 is "6:00". Then, the image-forming device calculates the validity duration of event registration by using the scheduled time Ts "15:00", the time "6:00" when the event registration request was received, and the margin time Y "10 minutes". As a result, the image-forming device calculates that the validity duration of event registration from the PC 202 is "8 hours and 50 minutes", and thus notifies the PC 202 of the calculated result.

Next, the PC 203 transmits the event registration request to the image-forming device at "7:00". That is, the time Tc in FIG. 15 is "7:00". Then, the image-forming device calculates the validity duration of event registration by using the scheduled time Ts "15:00", the time "7:00" when the event registration request was received, and the margin time Y "10 minutes". As a result, the image-forming device calculates that the validity duration of event registration from the PC 203 is "7 hours and 50 minutes", and thus notifies the PC 203 of the calculated result.

Subsequently, the PC 204 transmits the event registration request to the image-forming device at "8:00". That is, the time Tc in FIG. 15 is "8:00". Then, the image-forming device calculates the validity duration of event registration by using the scheduled time Ts "15:00", the time "8:00" when the event registration request was received, and the margin time Y "10 minutes". As a result, the image-forming device calculates that the validity duration of event registration from the PC 204 is "6 hours and 50 minutes", and thus notifies the PC 204 of the calculated result.

As a result, with respect to all the three PCs 202, 203 and 204, the validity duration of event registration expires at same "14:50". Accordingly, the times when these three PCs respectively transmit the event renewal requests to the image-forming device conform to others. Moreover, with respect to these event renewal requests, the image-forming device responds the prescribed value "5 hours" as the validity duration, whereby the times when these three PCs respectively transmit the event renewal requests to the image-forming device always conform to others after that.

As just described, according to the present embodiment, it is possible to conform the times when the event renewal requests are sent from the plural PCs to others, and it is moreover possible to conform the validity duration of event registration from the plural PCs to others. Moreover, since the validity duration of event registration is determined in consideration of the scheduled time when the image-forming device comes into the power saving mode, it is possible to prevent that the image-forming device receives the event renewal request immediately after the relevant image-forming device came into the power saving mode. As a result, it is possible to maintain power saving efficiency in the image-forming device.

Third Embodiment

Subsequently, the third embodiment of the present invention will be described. In the third embodiment, since an event renewal process is different from that in the second embodiment, such a difference will be described. More specifically, in the second embodiment, if the event renewal request is received, the validity duration of event registration is set to the prescribed value in any circumstances. However, as well as the event registration request, it is preferable to calculate and determine the validity duration of event registration also for the event renewal request sent from the PC.

In the present embodiment, according to reception timing, the validity duration of event registration is calculated for the event renewal request, as well as the event registration request.

Figure 17:
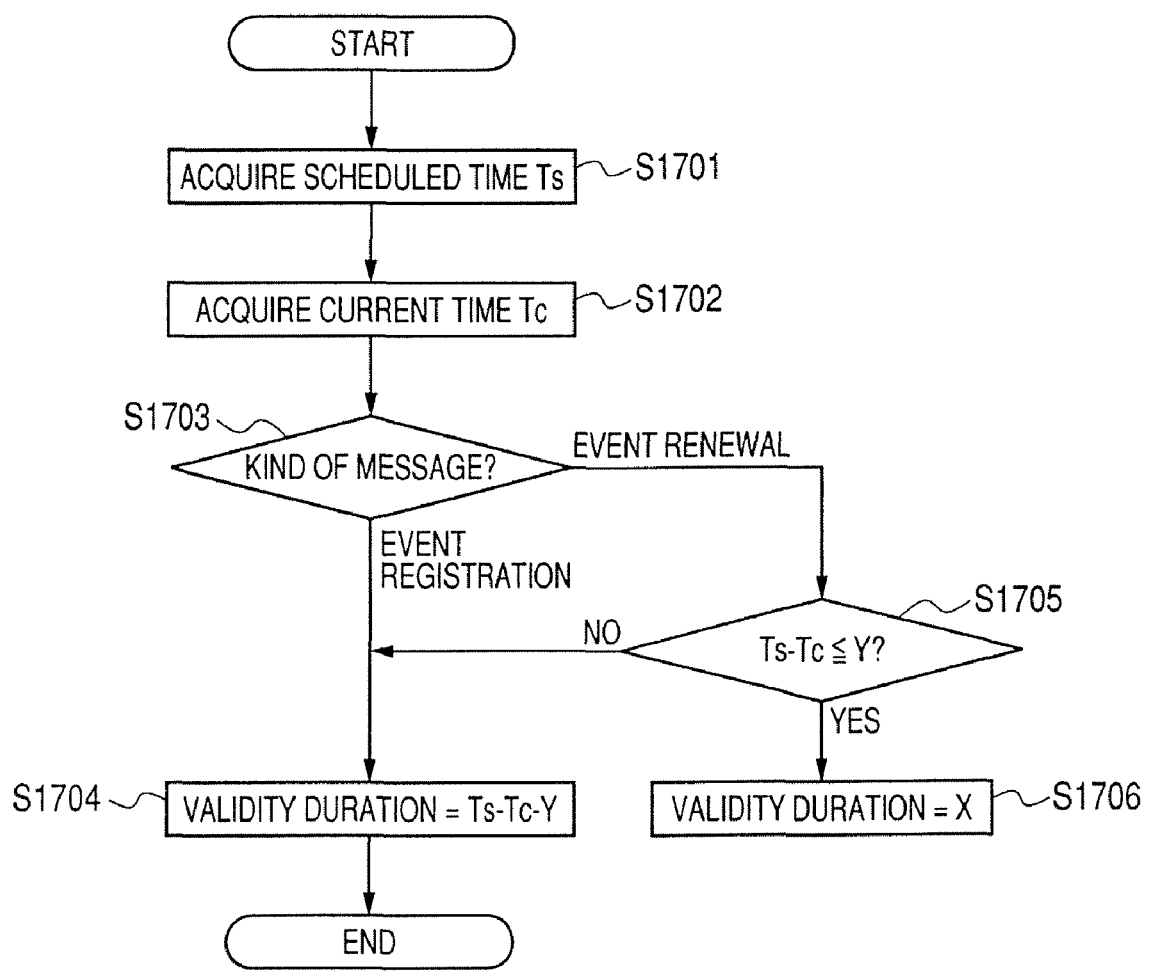
FIG. 17 is a flow chart illustrating a process of the validity duration determination unit according to the third embodiment.

FIG. 17 is a flow chart illustrating a process of the validity duration determination unit 403.

First, the scheduled time Ts is acquired in a step S1701, and the current time Tc is then acquired in a step S1702. Next, a kind of message received is determined in a step S1703. More specifically, if it is determined that the received message is the event registration request, the flow advances to a step S1704 to calculate a difference between the scheduled time Ts and the current time Tc to determine the value of the difference as the validity duration. On the other hand, if it is determined in the step S1703 that the received message is the event renewal request, the flow advances to a step S1705 to determine whether the value of the difference between the scheduled time Ts and the current time Tc is equal to or shorter (smaller) than the margin time Y. If it is determined in the step S1705 that the value of the different between the scheduled time Ts and the current time Tc is equal to or shorter (smaller) than the margin time Y, the flow advances to a step S1706 to determine the prescribed value X as the validity duration. On the other hand, if it is determined in the step S1705 that the value of the different between the scheduled time Ts and the current time Tc is longer (larger) than the margin time Y, the flow advances to the step S1704 to determine the calculated value of the difference as the validity duration.

Figures 18, 18A:
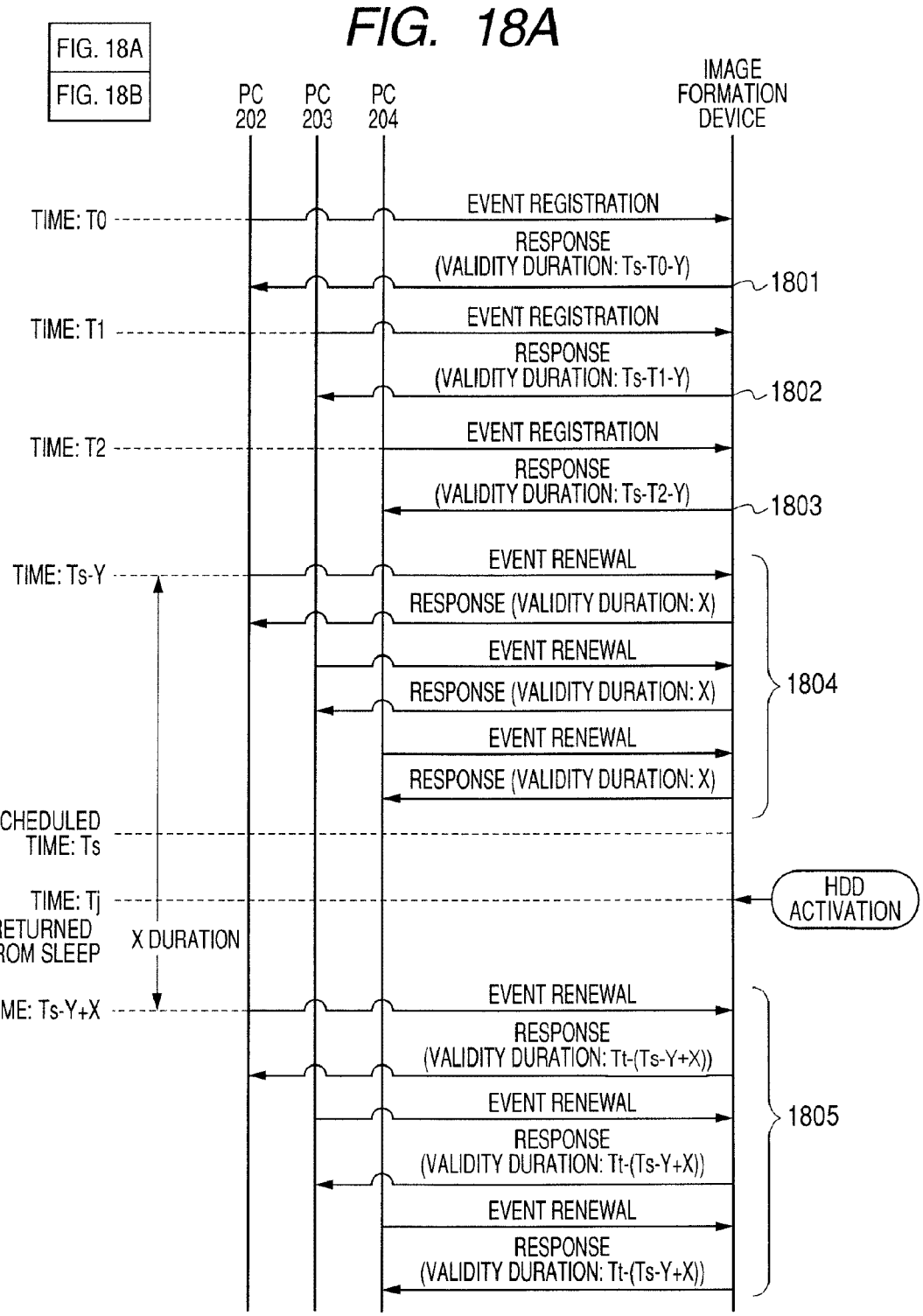
FIG. 18, which is composed of FIGS. 18A and 18B, is a diagram illustrating event registration/renewal states according to the third embodiment.
Figure 18B:
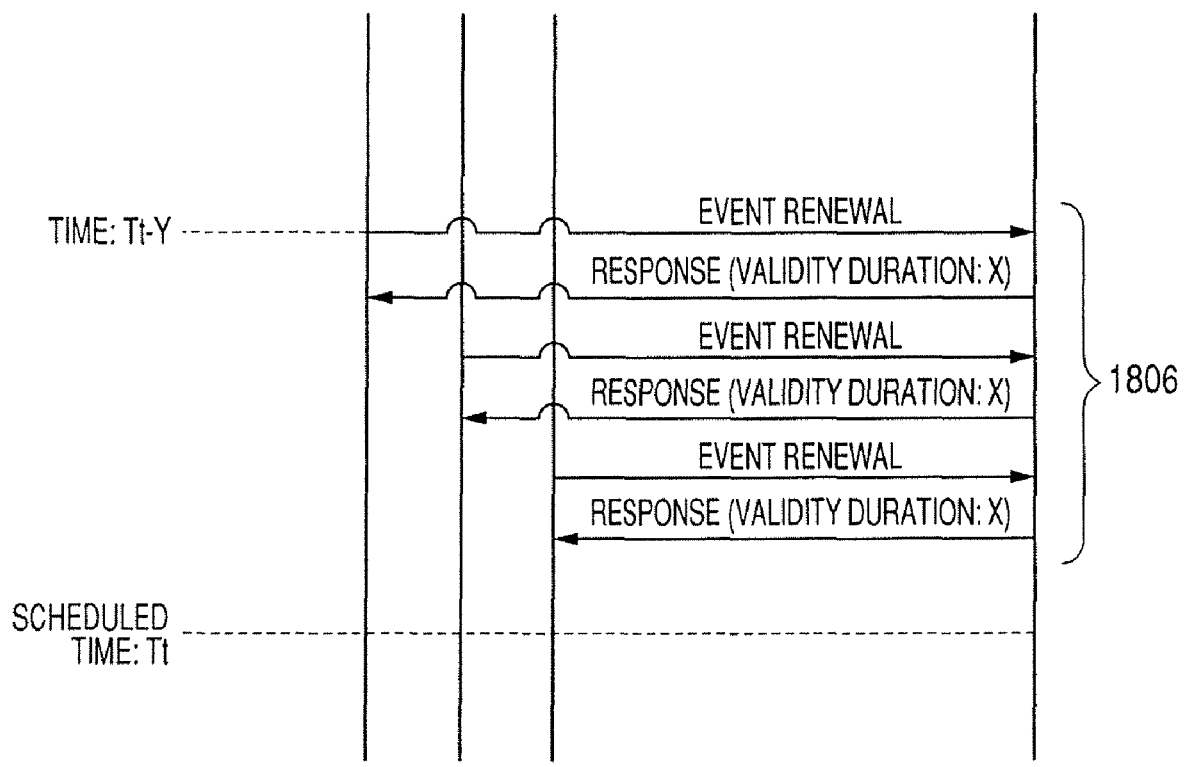

FIG. 18, which is composed of FIGS. 18A and 18B, is a diagram illustrating event registration/renewal states in a case where the PCs 202, 203 and 204 exist, according to the present embodiment. In FIG. 18, it is assumed that the power source of the external memory 311 has been turned on according to the operation state before the event registration is executed, and it is further assumed that the scheduled time when the HDD protection duration expires and the image-forming device comes into the second power saving mode is "Ts". Further, it is assumed that, at a time Tj, the external memory has been activated due to some kind or another reason such as job entering or the like and the image-forming device has returned from the second power saving mode. Moreover, it is assumed that the scheduled time when the HDD protection duration expires and the image-forming device next comes into the second power saving mode is "Tt".

Incidentally, since processes 1801, 1802, 1803 and 1804 are respectively the same as the processes 1601, 1602, 1603 and 1604 illustrated in FIG. 16, the description thereof will be omitted.

After then, at the time Tj, the external memory is activated due to some kind or another reason such as job entering or the like. Subsequently, the image-forming device calculates, by using the time Tj and the HDD protection duration, the scheduled time Tt when the image-forming device next comes into the second power saving mode, and determines the calculated time as the scheduled time Ts.

Then, if the event renewal request is again executed from each PC at a time "Ts−Y+X", the image-forming device calculates the value "Ts−Tc". At that time, "Ts" is equivalent to the time Tt, and "Tc" is equivalent to the time "Ts−Y+X". That is, the image-forming device resultingly calculates the value "Tt−(Ts−Y+X)". Since the calculated value is longer (larger) than the margin time Y, the image-forming device responds the validity duration of event registration equivalent to the value "Tt−(Ts−Y+X)−Y" as the response to the event renewal request (1805). As a result, the PC executes a next event renewal request at a time "Tt−Y" as in a process 1806.

Subsequently, the example illustrated in FIG. 18 will further be described concretely by using actual durations and times. Here, it is assumed that the scheduled time Ts is "15:00" and the margin time Y is "10 minutes". Further, it is assumed that the time Tj when the image-forming device which came into the second power saving mode at "15:00" returns from the second power saving mode is "16:00", and it is assumed that the HDD protection duration is "8 hours".

Incidentally, the processes to be executed up to the process 1804 are substantially the same as those concretely illustrated in FIG. 16, whereby the description thereof will be omitted.

If the image-forming device returns from the second power saving mode due to a reason such as job entering or the like at "16:00", the CPU 301 calculates the scheduled time, when the image-forming device next comes into the second power saving mode, based on the time "16:00", when the external memory was activated, and the HDD protection duration "8 hours". As a result, the scheduled time when the image-forming device next comes into the second power saving mode is determined as "24:00".

The three PCs 202, 203 and 204 respectively transmit the event renewal requests to the image-forming device at "14:50", and then receive the response indicating that the validity duration of event registration is "5 hours". That is, with respect to all the three PCs 202, 203 and 204, the validity duration of event registration again expires at same "19:50". For this reason, the three PCs 202, 203 and 204 respectively transmit the event renewal requests to the image-forming device at "19:50". Then, the CPU 301 of the image-forming device, which received these event registration requests, calculates a difference between the scheduled time "24:00" when the image-forming device comes into the second power saving mode and the current time "19:50". That is, the CPU 301 calculates the value of "Tt−(Ts−Y+X)". Then, the CPU 301 determines whether or not the calculated result is equal to or shorter (smaller) than "10 minutes", that is, whether or not the calculated result is equal to or shorter (smaller) than the margin time Y. In this case, the value of "Tt−(Ts−Y+X)" is acquired as "4 hours and 10 minutes" which is longer (larger) than "10 minutes". Accordingly, the validity duration of event registration with respect to the relevant event renewal request is not equivalent to the prescribed value X. In other words, the validity duration of event registration in this case is calculated based on "Tt−(Ts−Y+X)−Y", and "4 hours" is resultingly acquired. As a result, with respect to all the three PCs 202, 203 and 204, the validity duration of event registration expires at same "23:50".

As just described, according to the present embodiment, it is possible to conform the times when the event renewal requests are sent from the plural PCs to others, and it is moreover possible to conform the validity duration of event registration from the plural PCs to others. Moreover, since the validity duration of event registration is determined in consideration of the scheduled time when the image-forming device comes into the power saving mode, it is possible to prevent that the image-forming device receives the event renewal request immediately after the relevant image-forming device came into the power saving mode. In addition, with respect to the event renewal request sent from the PC, it is possible to calculate and thus determine the validity duration of event registration.

Other Embodiments

The present invention may be applied to a system which consists of plural units, or to a device which comprises a single unit.

Moreover, the present invention can be achieved in a case where the storage medium storing the program codes of software to achieve the flow charts of the above-described embodiments is supplied to a system or a device and then a computer (CPU or MPU) in the system or the device reads and executes the program codes stored in the storage medium.

In this case, the program codes themselves read from the storage medium achieve the functions of the above-described embodiments, whereby the storage medium storing these program codes constitutes the present invention.

As the storage medium for supplying the program codes, for example, a floppy disk, a hard disk, an optical disk, a magneto-optical disk, a CD-ROM, a CD-R, a DVD-ROM, a magnetic tape, a nonvolatile memory card, a ROM, or the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-344266, filed Dec. 21, 2006, which is hereby incorporated by reference herein in its entirety.

What is claimed is:

1. An image-forming device comprising:
at least a processor and a memory, functioning as:
a notification unit for notifying another device of an event generated in the image-forming device;
a registration unit for registering a notification destination of said notification unit;
a first determination unit for determining, in a case where a first request for registering a notification destination is received from a first information-processing device, a first validity duration of the registration based on the first request; and
a second determination unit for determining, in a case where a second request for registering a notification destination is received from a second information-processing device, a second validity duration of the registration based on the second request, on the basis of the first validity duration determined by said first determination unit.

2. The image-forming device according to claim 1, wherein said second determination unit is configured to determine the second validity duration such that a time when the first validity duration determined by said first determination unit expires and a time when the second validity duration determined by said second determination unit expires substantially match each other.

3. The image-forming device according to claim 1, wherein said processor and memory further function as:
a reception unit for receiving a third request for renewing the registration based on the first or the second request; and
a third determination unit for designating a predetermined specific duration as a third validity duration, with respect to the request for renewing the registration based on the first or the second request.

4. The image-forming device according to claim 1, wherein said notification unit is configured to notify notification destinations each of which has been registered for a validity duration that has not expired from among the notification destinations registered by said registration unit, of the event generated in the image-forming device.

5. A control method for an image-forming device, comprising:
a registration step of registering a notification destination to which a notification of an event generated in the image forming device is to be sent;
a first determination step of determining, in a case where a first request for registering a notification destination is received from a first information-processing device, a first validity duration of the registration based on the request; and
a second determination step of determining, in a case where a second request for registering a notification destination is received from a second information-processing device, a second validity duration of the registration based on the second request, on the basis of the first validity duration determined in said first determination step.

6. A non-transitory computer-readable storage medium storing a program that, when run on an image-forming device, causes the image-forming device to perform a method comprising:
a registration step of registering a notification destination to which a notification of an event generated in the image forming device is to be sent;
a first determination step of determining, in a case where a first request for registering a notification destination is received from a first information-processing device, a first validity duration of the registration based on the first request; and
a second determination step of determining, in a case where a second request for registering a notification destination is received from a second information-processing device, a second validity duration of the registration based on the second request, on the basis of the first validity duration determined in said first determination step.

7. An image-forming device comprising:
at least a processor and a memory, functioning as:
a notification unit for notifying another device of an event generated in the image-forming device;
a registration unit for registering a notification destination of said notification unit;
a specifying unit for specifying a time when the image-forming device comes into a power saving state; and
a determination unit for determining, in a case where a request for registering a notification destination is received, a validity duration of the registration based on the request, on the basis of the time specified by said specifying unit.

8. The image-forming device according to claim 7, wherein said determination unit is configured to determine the validity duration such that the validity duration expires before the time specified by said specifying unit.

9. The image-forming device according to claim 7, wherein said processor and memory further function as:
a reception unit for receiving a request for renewing a registration whose validity duration has expired;
a discrimination unit for discriminating whether or not a period from a time when the request for renewing the registration is received by said reception unit to the time specified by said specifying unit is equal to or shorter than a predetermined first duration; and
a second determination unit for
designating a predetermined second duration as the validity duration with respect to the request for renewing the registration in a case where it is discriminated by said discrimination unit that the period is equal to or shorter than the predetermined first duration, and
determining the validity duration such that the validity duration expires before a time when the image-forming device next comes into the power saving state with respect to the request for renewing the registration, in a case where it is not determined by said discrimination unit that the period is equal to or shorter than the predetermined first duration.

10. The image-forming device according to claim 7, wherein said notification unit is configured to notify notification destinations each of which has been registered for a validity duration that has not expired from among the notification destinations registered by said registration unit, of the event generated in the image-forming device.

11. A control method for an image-forming device, comprising:
a registration step of registering a notification destination to which a notification of an event generated in the image forming device is to be sent;
a specifying step of specifying a time when the image-forming device comes into a power saving state; and
a determination step of determining, in a case where a request for registering a notification destination is received, a validity duration of the registration based on the request, on the basis of the time specified in said specifying step.

* * * * *